US011175732B2

(12) United States Patent
Myers et al.

(10) Patent No.: US 11,175,732 B2
(45) Date of Patent: Nov. 16, 2021

(54) VIRTUAL REALITY APPARATUS

(71) Applicant: Roto VR Limited, Stanmore (GB)

(72) Inventors: Elliott Myers, Stanmore (GB); Gavin Waxkirsh, Stanmore (GB)

(73) Assignee: ROTO VR LIMITED

( * ) Notice: Subject to any disclaimer, the term of this patent is extended or adjusted under 35 U.S.C. 154(b) by 0 days.

(21) Appl. No.: 16/301,046

(22) PCT Filed: May 10, 2017

(86) PCT No.: PCT/GB2017/051295
§ 371 (c)(1),
(2) Date: Nov. 13, 2018

(87) PCT Pub. No.: WO2017/194935
PCT Pub. Date: Nov. 16, 2017

(65) Prior Publication Data
US 2019/0179408 A1    Jun. 13, 2019

(30) Foreign Application Priority Data

May 12, 2016 (GB) ...................... 1608382

(51) Int. Cl.
*G06F 3/01*    (2006.01)
(52) U.S. Cl.
CPC .............. *G06F 3/012* (2013.01); *G06F 3/011* (2013.01)
(58) Field of Classification Search
CPC .......... G06F 3/012; G06F 3/017; G06F 3/011; G06F 3/005; G06F 3/0346;
(Continued)

(56) References Cited

U.S. PATENT DOCUMENTS 5,490,784 A * 2/1996 Carmein ................ A63B 22/02
434/29
5,583,407 A * 12/1996 Yamaguchi ........... A63F 9/0291
273/375

(Continued)

FOREIGN PATENT DOCUMENTS

| EP | 0667603 | 8/1995 |
| GB | 2546312 | 7/2017 |
| WO | WO2016110686 | 7/2016 |

OTHER PUBLICATIONS

Hideaki Kuzuoka, "Designing a Robot as Communication Media— The Effect of Head and Body Movement on Co-Present's Impression—", https://irc.atr.jp/~noma/papers/Paper/CIRA-SS01-2.pdf, Jul. 16-20, 2003, IEEE, pp. 50-54 (Year: 2003).*

(Continued)

*Primary Examiner* — Dong Hui Liang
(74) *Attorney, Agent, or Firm* — Stetina Brunda Garred and Brucker

(57) ABSTRACT

An apparatus for virtual reality simulation includes a first base part and a second base part arranged to rotate relative to each other about a common axis. The apparatus also includes means for determining an angle between the first base part and the second base part. The second base part may be provided with a chair on which a user of the apparatus may sit during use of the apparatus. The means for determining an angle between the first base part and the second base part enables the apparatus to determine the direction in which the user is facing, relative to the first base part, after relative movement of the first base part and the second base part.

13 Claims, 2 Drawing Sheets

(58) Field of Classification Search
CPC .... G06F 3/04815; G06F 3/0338; G06F 1/163; G06T 19/006; G06T 13/40; G09B 9/00; G09B 9/12; G09B 9/02; G09B 9/04; G09B 9/10
See application file for complete search history.

(56) References Cited

U.S. PATENT DOCUMENTS

| | | | | |
|---|---|---|---|---|
| 5,830,113 | A * | 11/1998 | Goody | A63B 22/02 482/54 |
| 6,152,854 | A | 11/2000 | Carmein | |
| 7,004,885 | B1 * | 2/2006 | Wu | A63B 24/00 482/4 |
| 9,552,056 | B1 * | 1/2017 | Barry | G06F 3/01 |
| 2002/0197585 | A1 * | 12/2002 | Moran | G09B 19/16 434/62 |
| 2003/0125119 | A1 * | 7/2003 | Jones | A63G 31/16 472/60 |
| 2005/0037898 | A1 * | 2/2005 | Chang | A63B 22/0056 482/54 |
| 2009/0111670 | A1 | 4/2009 | Williams | |
| 2014/0077795 | A1 * | 3/2014 | Oberhauser | G01D 5/24438 324/207.25 |
| 2015/0312468 | A1 * | 10/2015 | Taylor | H04N 13/383 348/47 |
| 2015/0325027 | A1 * | 11/2015 | Herman | A63F 13/428 345/633 |
| 2016/0195923 | A1 * | 7/2016 | Nauseef | G06F 3/011 348/121 |
| 2017/0202358 | A1 * | 7/2017 | Werle | A63F 13/25 |

OTHER PUBLICATIONS

Saddington, Aaron, Great Britain Search Report, dated Oct. 1, 2017, 1 page, Intellectual Property Office, Great Britain.
Nesciobelli, Katazyna, International Search Report, dated Jul. 21, 2017, 12 pages, Rijswijk.
Exner, Philipp et al., BeGehen virtueller Welten, Jun. 3, 2004, 11 pages, http://www.icvr.ethz.ch/vrai_german/arbeiten/sa_exner_ruthstuhl_2004/bericht/BegehenVirtuellerWelten.pdf [retrieved Nov. 9, 2007].

* cited by examiner

VIRTUAL REALITY APPARATUS

CROSS-REFERENCE TO RELATED APPLICATIONS

The present application claims priority to PCT International Patent Application No. PCT/GB2017/051295, filed May 10, 2017 and Great Britain Patent Application No. 1608382.6, filed on May 12, 2016, the disclosure of which are incorporated herein by reference.

STATEMENT RE: FEDERALLY SPONSORED RESEARCH/DEVELOPMENT

Not Applicable

FIELD OF THE INVENTION

The invention relates to an apparatus for virtual reality simulation. In particular, it relates to an apparatus for tracking movement of a user's head and movement of a user's body independently from one another.

BACKGROUND

A virtual reality apparatus typically includes a headset which a user of the apparatus wears during use of the virtual reality apparatus. The headset can be connected to a controller (such as a personal computer or games console) which is able to output images and/or audio to the headset for playback to the user. The images and/or audio may correspond to a virtual reality environment created by the controller.

The virtual reality apparatus may allow a user to 'explore' or 'navigate' a virtual reality environment. The user may explore the virtual reality environment by providing inputs to the controller using a user input device. The inputs may allow the user to 'move' within the virtual reality environment which the controller creates. The user might, for example, manipulate a hand-held user input device to provide inputs to the controller, e.g., by pressing buttons or moving one or more joysticks of the hand-held user input device.

The controller, in response to the manipulations of the hand-held user input device, might cause a change in what is being played back to the user on the headset, to give the user the sensation that he or she is moving in the virtual reality environment.

Some virtual reality apparatuses are equipped with a camera. In the case of a games console, for example, a camera may be connected to the console and mounted on a shelf or a wall in a room with the user to monitor the user's movements within the room. A user of such a system might instead of or in addition to manipulating a hand-held user input device move one or more parts of his or her body in the real world to cause a corresponding movement in the virtual reality environment. The camera might track the user's motion in the real world and provide an input to the controller to cause the controller to play back images and/or audio as if the user has moved in a corresponding way in the virtual reality environment.

A virtual reality apparatus which uses a camera in this way is typically limited to determining only one user movement parameter with the camera. For example, the camera may be able to determine a direction in which the user is looking by monitoring the rotation of the user's head in real space. However, the camera may not be able to reliably determine both the direction in which the user is looking and the direction in which the user's body (e.g., torso) is pointing through a full range of user movements. What is more, a camera which is monitoring rotation of a user's body in real space cannot also monitor movement of the user's hands (e.g., to determine gestural inputs) when the user rotates in real space beyond a certain angle relative to the camera and obscures his or her hands from the camera's view with his or her own body.

Thus such a virtual reality apparatus may not be able to reliably determine more than one of a direction in which a user is looking (i.e., a direction in which the user's head is pointing); a direction in which a user is facing (i.e., the direction in which the user's body is pointing); and a direction in which a user's hand is pointing or moving.

Some users of virtual reality apparatus find that visual representation of 'movement' provided by a headset without the same or a corresponding physical movement detected by other senses (e.g., the vestibular system) provokes disorientation, nausea and other unpleasant responses.

If, for example, a user of a virtual reality apparatus is expected (e.g., in the course of gameplay or while watching a film) to look or face in a particular direction in a virtual reality environment at a given time (e.g., so that the user witnesses a particular event), the virtual reality apparatus may simply play back images to the user as if the user has turned to look or face in that particular direction, irrespective of the user's movements in real space. The visual sensation of turning without the corresponding vestibular sensation of turning may make the user unstable and possibly cause the user to fall over and injure him- or herself.

Alternatively, the virtual reality apparatus may determine (e.g., using a camera) that the user's current direction of looking/facing in real space does not correspond to the particular direction in the virtual reality environment but allow the user's direction of looking/facing in real space to overrule the need to look/face in the particular direction in the virtual reality environment. The user may therefore continue looking/facing in the wrong direction in the virtual reality environment and miss the particular event which it was intended the user would witness.

Additionally, some virtual reality apparatus requires cables for connecting the headset to a controller (e.g., personal computer, games console) which is fixed in real space. A user may therefore be limited in how much he or she can move—in particular, rotate—by the cables which connect the headset to the controller, since the cables have finite lengths and may wind themselves round the user, distracting the user from the virtual reality experience. This limitation can cause frustration to users of such virtual reality apparatus.

The invention aims to go some way towards overcoming or at least ameliorating one or more of the above problems.

BRIEF SUMMARY OF SOME EMBODIMENTS OF THE INVENTION

Accordingly, there is provided an apparatus for virtual reality simulation, including a first base part and a second base part arranged to rotate relative to each other about a common axis; and means for determining an angle between the first base part and the second base part.

Preferably the apparatus is arranged for a user to sit or stand on.

Preferably the apparatus includes a user input device which may be arranged to allow a user of the apparatus to control rotation of the first base part and the second base part relative to each other about the common axis.

In some embodiments, the user input arranged to allow the user to control rotation of the first and second base parts is a foot-operated user input. The foot-operated user input may include an input part which is arranged such that it can rotate about an axis. The input part may be arranged to control relative rotation of the first and second base parts in dependence upon rotation of the input part about its axis away from an initial position.

The foot-operated user input may include foot pedals which serve as additional user inputs. Foot pedals may be preferred to other user input devices, because they can be hinged to mimic in-game "feet", allowing actions such as walking movement. This is a natural sensation and leaves a user able to focus on their other in-game actions with other natural/appropriate interfaces such as hand controls via a hand-tracking camera.

In other embodiments, the user input arranged to allow the user to control rotation of the first and second base parts is a user input worn by the user. The user input may be worn on the head of the user and may sense movement of the user's head. The user input (also termed user input means) may determine the direction in which the user is looking (i.e. the direction in which the user's head is pointing), and/or a movement (e.g., rotation) of the user's head between a first position and a second position. The user input may allow rotation of the first and second base parts relative to each other to be controlled, by drive control means, in dependence on the direction in which the user is looking and/or in dependence on movement of the user's head.

The means for determining an angle between the first base part and the second base part may be used to determine the direction in which the user is facing (i.e., the direction in which the user's chest or torso is pointing). This determination may be used in conjunction with a determined direction in which the user is looking to control rotation of the first and second base parts relative to each other.

For example, the direction in which the user is looking and the direction in which the user is facing may be compared. If the difference between the direction of looking and the direction of facing is greater than a certain angle, the first and second base parts may be caused to rotate relative to each other.

BRIEF DESCRIPTION OF THE DRAWINGS

The accompanying drawings, which are incorporated in and constitute part of this specification, show embodiments of the invention for illustrative purposes only, that is to teach the invention to the skilled person so as to allow the skilled person to carry out the invention within the scope of the appended claims.

DETAILED DESCRIPTION

The detailed description set forth below is intended as a description of the presently preferred embodiment of the invention, and is not intended to represent the only form in which the present invention may be implemented or performed. The description sets forth the functions and sequences of steps for practicing the invention. It is to be understood, however, that the same or equivalent functions and sequences may be accomplished by different embodiments and that they are also intended to be encompassed within the scope of the invention.

Figure 1:
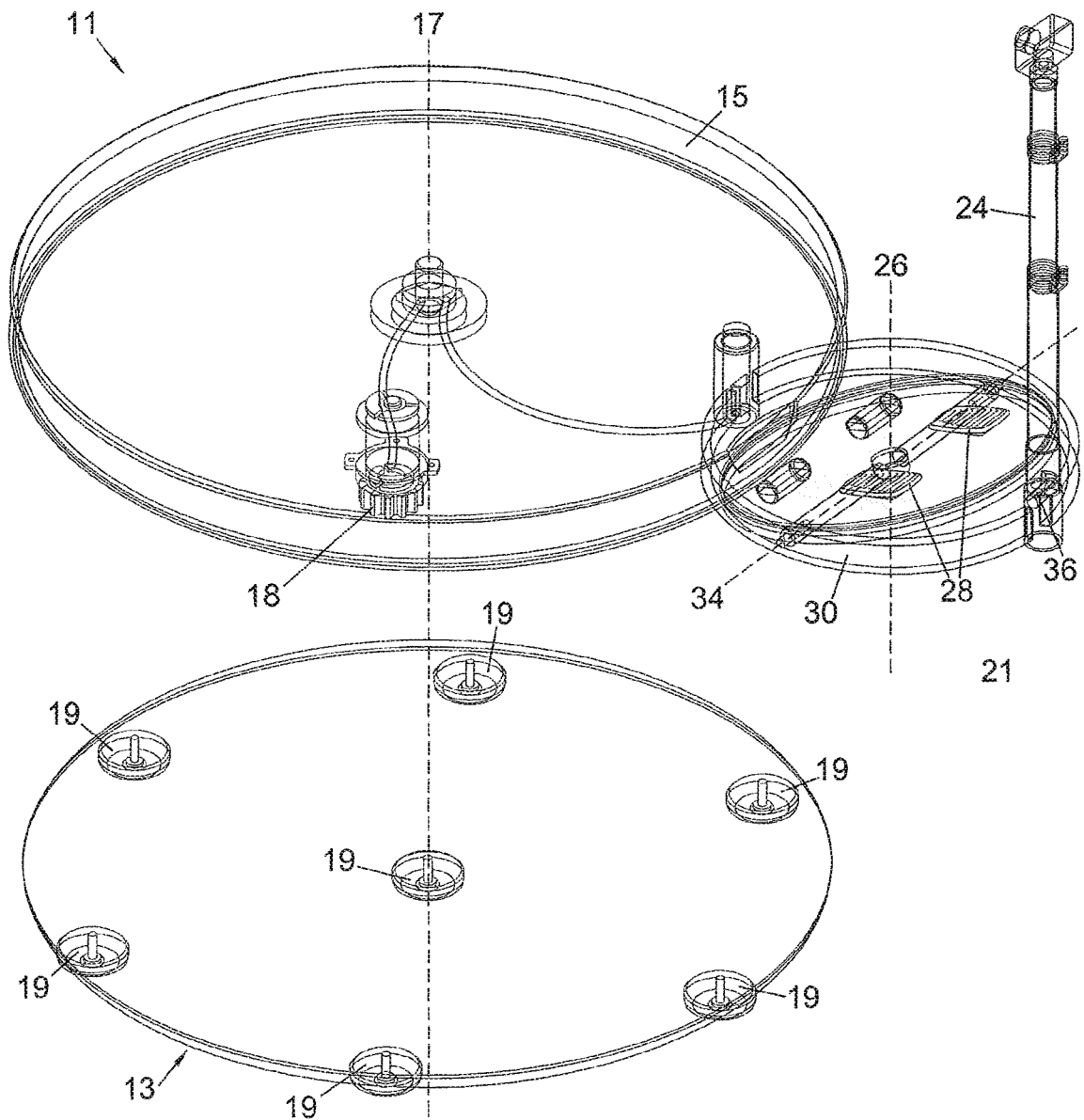
FIG. 1 schematically illustrates in a perspective view an apparatus for virtual reality simulation in accordance with an embodiment of the invention.

FIG. 1 illustrates an apparatus 11 for virtual reality simulation. The apparatus 11 includes a first base part 13 and a second base part 15. In the illustrated example, the first base part 13 and the second base part 15 are approximately circular in cross-section and cylindrical in overall shape. One of the base parts 13, 15 may (though need not necessarily) fit at least partially inside the other of the base parts 13, 15.

The first base part 13 is arranged to be mounted on a surface such as a floor, stage or dais. In the illustrated example, the first base part 13 is provided on one side with feet 19 via which the first base part 13 can be mounted on the surface. In other examples, the first base part 13 may not include feet 19. The underside of the first base part 13 may instead be substantially flat, so that the first base part 13 can be mounted on the surface with its underside substantially flush with and flat against the surface.

The second base part 15 is arranged to be mounted on the first base part 13. In particular, the second base part 15 is arranged to be mounted on the first base part 13 such that the first base part 13 and the second base part 15 can rotate relative to one another about a common axis 17. The first and second base parts 13, 15 may be arranged such that the second base part 15 can rotate in either direction (clockwise or anticlockwise) relative to the first base part 13 about the common axis 17. One of the base parts 13, 15 may be provided with an axle or a spindle with which the other of the base parts 15, 13 can engage and about which the base parts 13, 15 can rotate relative to each other.

In the illustrated example, the first base part 13 may be arranged to remain substantially stationary in a reference frame of the room in which the apparatus is located (e.g., relative to the surface on which the first base part 13 is mounted) during use of the apparatus 11. The second base part 15 may be arranged to rotate in the reference frame of the room (e.g., relative to the surface on which the first base part 13 is mounted and relative to the first base part 13 itself) during use of the apparatus 11.

The apparatus 11 includes means for determining an angle between the first base part 13 and the second base part 15. The means for determining an angle between the first base part 13 and the second base part 15 may determine an angle between a given radial line of the first base part 13 and a given radial line of the second base part 15. The angle between the given radial line of the first base part 13 and the given radial line of the second base part 15 may be measured in a plane substantially parallel to the plane of the first base part 13 or in a plane substantially parallel to the plane of the second base part 15. In some circumstances (such as if the plane of the second base part 15 is not substantially parallel to the plane of the first base part 13) the angle between the first base part 13 and the second base part 15 may be measured between a radial line of the first base part 13 and a projection of a radial line of the second base part 15 on a plane substantially parallel to the first base part 13 (or vice versa).

The means for determining an angle between the first base part 13 and the second base part 15 may, as examples, include a mechanical device, a resistive electronic device, a capacitive electronic device, an optomechanical device, or any other suitable type of device for determining an angle between two parts which can rotate relative to one another about a common axis.

In the illustrated apparatus 11, the means for determining an angle between the first base part 13 and the second base part 15 takes the form of a potentiometer. A potentiometer included in such an apparatus 11 may be mounted on or about the axis 17 about which the base parts 13, 15 rotate. The potentiometer may for example include a first part which is fixed to the first base part 13 such that the first part rotates, relative to the second base part 15, with the first base part 13, and a second part which is fixed to the second base part 15 such that the second part rotates, relative to the first base part 13, with the second base part 15.

In other examples of the apparatus, the means for determining an angle between the first base part 13 and the second base part 15 takes the form of a rotary (or "shaft") encoder. Depending on the particular application and the configuration of the apparatus 11, the rotary encoder may be an absolute rotary encoder or an incremental rotary encoder. Rotary encoders may advantageously be able to turn infinitely in either direction and still provide an output.

The means for determining an angle between the first base part 13 and the second base part 15 may determine an angle between the first base part 13 and the second base part 15 using a difference between a current position of the second base part 15 relative to the first base part 13 and an initial position of the second base part 15 relative to the first base part 13 determined at or near the beginning of one use session of the apparatus 11. For example, the means for determining an angle between the base parts 13, 15 may determine a change in angle between the base parts 13, 15 based on an angle between the base parts 13, 15 when the apparatus 11 was switched on for that use session. This may advantageously mean that there is no 'home' position to which the first and second base parts 13, 15 of apparatus 11 must return at the end of a use session of the apparatus 11. In such embodiments, a new 'zero' or 'home' position of the second base part 15 relative to the first base part 13 may be determined (or effectively defined) each time the apparatus 11 is switched on or each time use of the apparatus 11 begins.

In the case of the potentiometer as the means for determining an angle between the base parts 13, 15, an initial potential reading may be taken at the point when the apparatus 11 is switched on or use of the device begins. This provides an indication of the initial angular position of the second base part 15 relative to the first base part 13. Further potential readings may be taken at later times, and the magnitudes and signs (positive or negative) of the differences between the readings may be used to determine how much and in which direction the second base part 15 has moved relative to the first base part 13 since the apparatus 11 was switched on.

Alternatively, the means for determining an angle between the base parts 13, 15 may determine an angle between the base parts 13, 15 relative to a predetermined arrangement of the base parts 13, 15 (i.e., relative to a predetermined 'zero' or 'home' position of the second base part 15 relative to the first base part 13, the predetermined 'zero' or 'home' position being the same for each use session of the apparatus 11). In some such embodiments, the base parts 13, 15 may need to begin and end each use session at the same angle relative to each other (e.g., with particular features of the first base part 13 and the second base part 15 in line with each other) in order for the means for determining an angle between the base parts 13, 15 to correctly determine an angle between the first base part 13 and the second base part 15. The means for determining an angle between the base parts 13, 15 may determine the angular displacement of the base parts 13, 15 relative to that predetermined 'zero' or 'home' position.

As illustrated in FIG. 1, apparatus 11 includes a motor 18. The motor (also termed base drive means) 18 may be arranged to cause the second base part 15 to rotate relative to the first base part 13. The illustrated motor 18 is mounted on the second base part 15 such that the motor 18 rotates about the axis 17 with the second base part 15. The motor 18 includes a locally rotating component (i.e., a component which rotates locally to the motor 18, about an axis of the motor 18), such as a disc, gear or arm, which is arranged to engage (directly or indirectly, e.g., via another disc or gear) with a component of the first base part 13 to cause the second base part 15 to rotate relative to the first base part 13 when the rotating component rotates about an axis of the motor 18.

The locally rotating component of the motor 18 may for instance be a disc arranged to contact a surface at or near the outer circumference of the first base part 13. Friction between the disc and the surface of the first base part 13 causes the second base part 15 to rotate relative to the first base part 13 when the disc rotates. The locally rotating component of the motor 18 may alternatively be a gear 33 (see FIG. 2). Teeth of the gear 33 may engage with corresponding teeth in a toothed component 35 (e.g., a toothed ring) of the first base part 13.

In other examples, a motor may instead be mounted on the first base part 13. In such examples, a locally rotating component of the motor may analogously be arranged to engage (directly or indirectly) with a component of the second base part 15 to cause the second base part 15 to rotate relative to the first base part 13.

In examples in which the means for determining an angle between the base parts 13, 15 determines the angular displacement of the base parts 13, 15 relative to a predetermined 'zero' or 'home' position which is the same for each use session of the apparatus 11, the motor may be arranged to cause the base parts 13, 15 to return to that 'zero' or 'home' position at the end and/or beginning of each use session.

Figure 2:
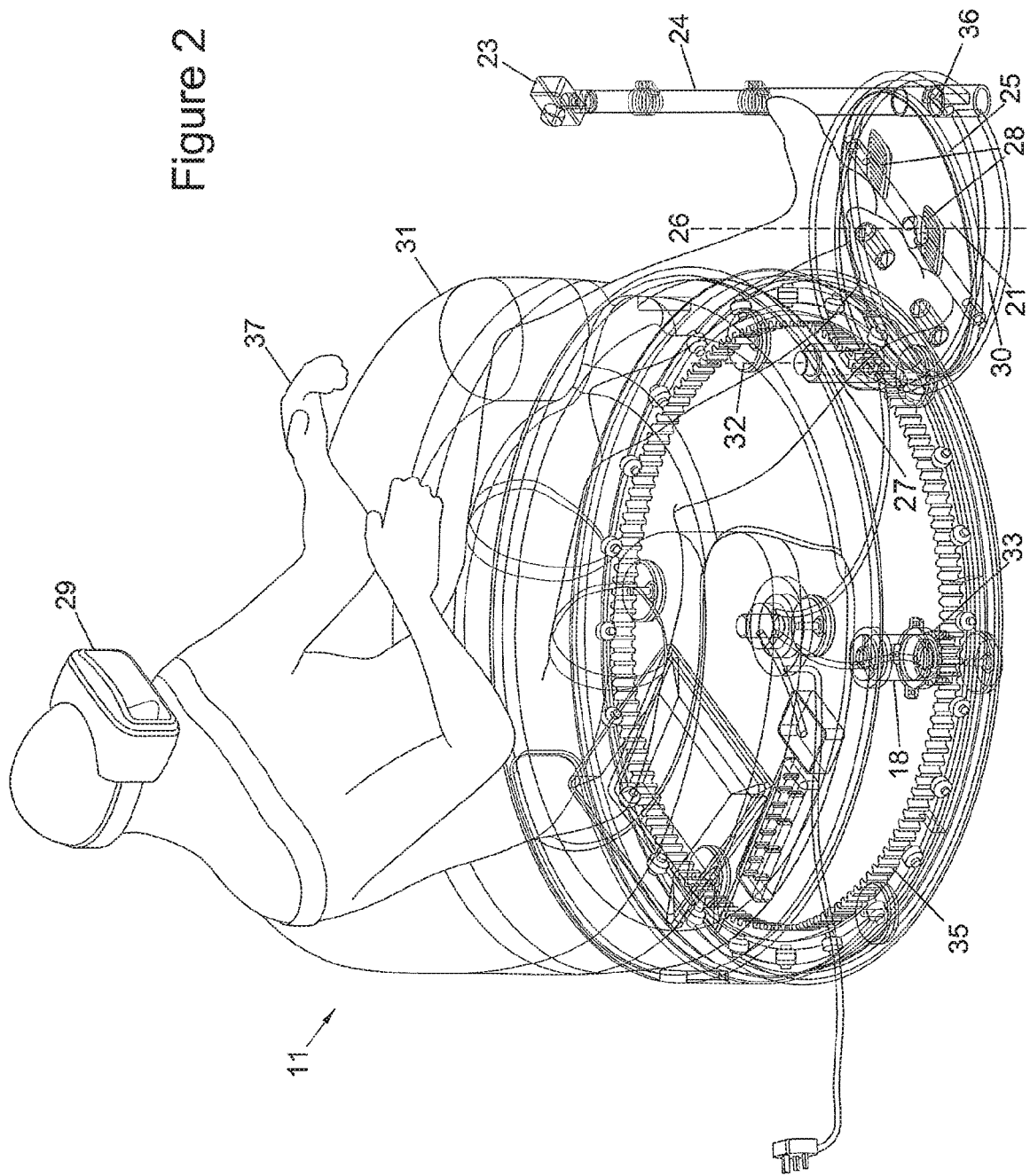
FIG. 2 schematically illustrates in a perspective view a user using an apparatus for virtual reality simulation in accordance with an embodiment of the invention.

As illustrated in FIG. 2, a chair 31 may be mounted on the second base part 15. The chair 31 is mounted on the second base part 15 such that the chair 31 is arranged to move (in particular, rotate) with the second base part 15 relative to the first base part 13 (about the axis 17). A user 37 of the apparatus 11 may sit in the chair 31 such that the user 37 moves (in particular, rotates) relative to the first base part 13 when the second base part 15 and the chair 31 rotate relative to the first base part 13 about the axis 17.

The chair 31 is fixed relative to the second base part 15. Therefore, the chair 31 rotates with the second base part 15 relative to the first base part 13. The chair's orientation relative to the second base part 15 does not change. The chair's orientation relative to the first base part 13 changes in the same way that the orientation of the second base part 15 relative to the first base part 13 changes. Therefore, provided that the apparatus 11 knows the orientation of the chair 31 relative to the second base part 15 (which does not change in time), the apparatus 11 can use the means for determining an angle between the first base part 13 and the second base part 15 to determine the direction in which a user 37 sitting in the chair 31 is facing (i.e., the direction in which the user's body is pointing), by determining the angle between the second base part 15 and the first base part 13, and adjusting for the (fixed) orientation of the chair 31 relative to the second base part 15.

Although in the illustrated embodiment a chair 31 is mounted on the second base part 15, in other embodiments the second base part 15 may include a stool or platform which is mounted on or part of the second base part 15 such that the stool or platform rotates with the second base part 15 relative to the first base part 13. A user of the apparatus may then sit or stand on the stool or platform such that the user rotates with the second base part 15 and the stool or platform relative to the first base part 13.

The second base part 15, the stool or the platform may include one or more indicators (such as an arrow, footmarks or other indicator(s)) to indicate to a user which way the user's body should face when the user is sitting or standing on the stool or platform. This ensures that the apparatus 11 can determine the direction in which the user is facing (i.e. the direction in which the user's body is pointing). The radial line of the second base part 15 that is compared with a radial line of the first base part 13 may coincide with or be orientated at the same angle as the indicator(s), or be offset at a known angle from the direction of the indicator(s).

The second base part 15 may additionally or alternatively include a handlebar which the user of the apparatus 11 can hold on to during use of the apparatus 11. The handlebar may be arranged to telescope in order to change length such that it can be used by a user who is sitting down on the second base part 15 (on the upper surface of the second base part 15, on a chair, or on a stool, for example), or by a user who is standing up on the second base part 15 (on the upper surface of the second base part 15 or on a platform that is part of or mounted on the second base part 15, for example), regardless of the user's height.

In the illustrated embodiments, apparatus 11 also includes a user input 21 arranged to provide inputs to a controller (not shown). The user input 21 includes a rotating plate 25 with foot pedals 28 on an upper surface of the rotating plate 25. The rotating plate 25 (and therefore, indirectly, the foot pedals 28) may be supported by a component 30 (such as a ring) of the user input 21. The component 30 is arranged such that the component 30 (and the supported rotating plate 25 and foot pedals 28) can rotate about an axis 32 relative to the second base part 15.

As will be explained in more detail below, the rotating plate 25 of the user input 21 may be arranged to control rotation of the first and second base parts relative to each other about their common axis. Additionally, the rotating plate 25 may include foot pedals 28 which are hinged such that they can provide additional inputs, e.g., mimicking in-game "feet" allowing actions such as walking movement. This is a natural sensation and leaves a user able to focus their other in-game actions with other natural/appropriate interfaces such as hand controls via a hand-tracking camera.

In the illustrated example, the component 30 is arranged to rotate (with the rotating plate 25, foot pedals 28) about the axis 32 under the action of a motor 27. In other examples, the apparatus 11 may not include such a motor 27. In such examples, the component 30 (and rotating plate 25, foot pedals 28) may instead be rotated about the axis 32 relative to the second base part 15 by a user applying a pushing or pulling force to move the component 30 (and rotating plate 25, foot pedals 28) relative to the second base part 15.

The component 30, the rotating plate 25 and the foot pedals 28 may be arranged such that they can be stowed in a recess of the second base part 15. The motor 27 may be arranged such that it can cause the component 30 (and therefore the rotating plate 25 and the foot pedals 28) to rotate about the axis 32 to exit or enter the recess of the second base part 15. The component 30 (with the rotating plate 25 and foot pedals 28) may be constrained by the motor 27 such that the component 30 can only rotate about the axis 32 under the action of the motor 27. This may prevent a user from inadvertently rotating the component 30, the rotating plate 25 and the foot pedals 28 about the axis 32 during use of the apparatus 11. In other embodiments, other features of the apparatus 11 may constrain the movement of the component 30 and the parts it supports about the axis 32 to prevent inadvertent movement of the component 30 about the axis 32 by a user of the apparatus 11.

The motor 27 may be arranged to cause the component 30 (and thus the rotating plate 25 and the foot pedals 28) to rotate about the axis 32, relative to the second base part 15, through a predetermined angle from the 'stowed' position (in which the component 30 with the rotating plate 25 and foot pedals 28 is stowed in the recess of the second base part 15). This may, for example, occur when the apparatus 11 is switched on, or in response to an input from a user of the apparatus 11. After rotating about the axis 32 relative to the second base part 15 through the predetermined angle from the 'stowed' position, the component 30, the rotating plate 25 and the foot pedals 28 may be positioned in an optimum position for actuation and/or control by a user of the apparatus 11.

For example, in the optimum position, the component 30, the rotating plate 25 and the foot pedals 28 may be positioned immediately in front of the chair 31 (or stool or platform) of the apparatus 11, such that a user 37 sitting in the chair 31 or on the stool (or standing on the platform) may rest a foot or both feet on the rotating plate 25 and/or the foot pedals 28. This optimum position of the component 30, the rotating plate 25 and the foot pedals 28 relative to the second base part 15 may be referred to as a 'use' position of the component 30, the rotating plate 25 and the foot pedals 28. The predetermined angle in such examples may be approximately 180°.

With the component 30, the rotating plate 25 and the foot pedals 28 in the optimum ('use') position, the rotating plate 25 and the foot pedals 28 may be actuated by a foot or feet of a user 37 sitting in a chair 31 or stool or standing on a platform of the apparatus 11.

The rotating plate 25 is arranged such that it can rotate, relative to the component 30, about an axis 26. The axis 26 may be generally at the centre of the rotating plate 25 and generally orthogonal to the plane of the rotating plate 25, so that the rotating plate 25 is able to rotate about roughly a centre point of the rotating plate 25. In other examples, the axis 26 may not coincide with the centre of the rotating plate 25 and may instead be offset from the centre of the rotating plate 25. The axis 26 need not necessarily be orthogonal to the plane of the rotating plate 25.

The rotating plate 25 may have a rotational 'zero' or 'home' position about the axis 26 relative to the component 30. In the 'zero' or 'home' position, a given radial line of the rotating plate 25 points in substantially the same radial direction as a given radial line of the component 30. For instance, with the component 30 rotated (about axis 32) to the optimum ('use') position relative to the second housing part 15, a particular radial line of the component 30 points forwards, away from the housing parts 13, 15, in substantially the same radial direction as the direction in which the chair 31 (or stool or platform) faces. In the rotational 'zero' or 'home' position of the rotating plate 25 relative to the component 30 (about axis 26), the radial line of the rotating plate 25 passing between and running substantially parallel to the longitudinal axes of the foot pedals 28 may point in substantially the same radial direction as the particular, forwarding-pointing radial line of the component 30 described above.

In some examples, the rotating plate 25 may be biased (e.g., with a spring or other biasing means) to return to the 'zero'/'home' position relative to the component 30. In some examples, the rotating plate 25 may be constrained such that it cannot rotate through more than a given angle anticlockwise or clockwise from the 'zero'/'home' position. For example, the rotating plate 25 may be constrained such that it cannot rotate more than half a turn or a quarter of a turn anticlockwise or clockwise from the 'zero'/'home' position. In other examples, such biases and/or constraints may not be imposed on the rotating plate 25.

A user 37 sitting on the chair 31 or stool (or standing on a platform) may rotate the rotating plate 25 clockwise or anticlockwise about the axis 26. Rotating the rotating plate 25 about the axis 26 may cause the user input 21 to provide an input to the controller. The controller may, in response to the input from the user input 21, control one or more parts of the apparatus 11. For example, the user 37 may rotate the rotating plate 25 anticlockwise about the axis 26 by moving a foot or feet relative to the axis 26. The user input 21 may, in response to the movement of the rotating plate 25, provide an input to the not-illustrated controller. In response to the input from the user input 21, the controller may control the motor 18 to cause the second base part 15 to rotate anticlockwise relative to the first base part 13.

Thus a user 37 of the apparatus 11 may control the apparatus 11 to make the user 37 face in a particular direction in real space, using the user input 21. Because the apparatus 11 includes means for determining an angle between the second base part 15 (including the chair 31 and thus also the user 37) and the first base part 13, the apparatus 11 can determine the direction in which the user 37 is facing in real space at any given time by determining the angular position of the second base part 15 relative to the first base part 13. Using the information about the direction in which the user 37 is facing in real space, the apparatus 11 can determine the direction in which the user 37 is facing (or should be facing or wishes to face) in a virtual reality environment.

The user input 21, controller and motor 18 may be arranged to cause the second base part 15 to continue rotating about the axis 17 relative to the first base part 13 while the rotating plate 25 is offset from its 'zero'/'home' position. Thus the user 37 may stop the second base part 15 from rotating about the axis 17 relative to the first base part 13 by returning to the rotating plate 25 to its 'zero'/'home' position relative to the component 30. The user 37 may return the second base part 15 to the previous angular position relative to the first base part 13 by rotating the rotating plate 25 relative to the component 30 in the opposite direction to before. In such examples, the angle through which the user 37 rotates the rotating plate 25 relative to the component 30 may affect the speed with which the second base part 15 rotates about axis 17 relative to the first base part 13.

Alternatively, the user input 21, controller and motor 18 may be arranged to rotate the second base part 15 about the axis 17 relative to the first base part 13 through an angle corresponding to the angle through which the rotating plate 25 is rotated by the user 37 relative to the component 30. For example, if the user 37 of the apparatus 11 rotates the rotating plate 25 anticlockwise through an angle of 30°, the user input 21, controller and motor 18 may cause the second base part 15 to rotate anticlockwise through an angle of 30° relative to the first base part 13.

In other examples, the second base part 15 may be caused to rotate about axis 17 relative to the first base part 13 through an angle which is dependent upon the angle through which the user 37 has rotated the rotating plate 25 about axis 26 from the 'zero'/'home' position. For instance, in some cases, a scaling factor of 2 may be applied, such that rotating the rotating plate 25 through an angle of 30° about axis 26 causes the second base part 15 to be rotated about axis 17 through an angle of 60° relative to the first base part 13. In other examples, different scaling may be used, including non-linear scaling (e.g., logarithmic scaling) and/or reversed-direction scaling (so that, for example, rotation of the rotating plate 25 relative to the component 30 about the axis 26 in a clockwise direction causes rotation of the second base part 15 relative to the first base part 13 about the axis 17 in an anticlockwise direction).

In some examples, the rotating plate 25, in addition to being arranged to rotate relative to component 30 about substantially vertical axis 26 (see FIG. 1), may be arranged to rotate relative to component 30 about a substantially horizontal axis 34 which extends through or parallel to the plane of the rotating plate 25. The rotating plate 25 being arranged to rotate about this additional, substantially horizontal axis 34 may enable a user 37 of the apparatus 11 to adjust the angle of the rotating plate 25 so that the user 37 is able to manipulate the rotating plate 25 and the foot pedals 28, or so that the user 37 can manipulate the rotating plate 25 and the foot pedals 28 more comfortably. In such cases, the projection of the forward-pointing radial line of the rotating plate 25 on the horizontal axis when the rotating plate 25 is in the 'zero'/'home' position may be in roughly the same direction as the forward-pointing radial line of the second base part 15.

Manipulation of the foot pedals 28 may cause the user input 21 to provide an input to the controller. The controller may, in response to the input from the user input 21, control one or more parts of the apparatus 11. Actuation of the foot pedals 28 may for instance cause a user to take steps in a virtual reality environment, which may cause new or different visual images to be displayed on a headset of the apparatus, or, if appropriate, cause rotation of the second base part 15 about the axis 17 relative to the first base part 13.

In some examples, relative rotation of the first base part 13 and the second base part 15 about the axis 17 may be controlled using a wearable user input instead of using a foot-controlled user input 21 such as that illustrated in FIGS. 1-2.

An example of a wearable user input will now be described. The user input is wearable on the head of the user and includes a gyroscope, an accelerometer and a magnetometer (though, in other examples, it might include only one or only two of those components). The gyroscope, accelerometer and magnetometer together or individually provide an indication of the direction in which the user is looking, by monitoring the position and/or movements of the user's head. One of the components might, for example, provide an approximate but quick indication of the direction in which the user's head is pointing during and after the user's head has moved, and one of the other components might provide a more accurate indication of the direction in which the user's head is pointing after a longer period of time. Each of the components may provide information about the movement of the user's head in three dimensions. The three components together may therefore provide 9 dimensions (or "degrees of freedom") of information. In some examples, a first one of the components may provide a first indication of the orientation of the user's head. A movement of the user's head in a different plane or sense may disrupt or interfere with that first component's first indication. In such circumstances, a second indication from a second one of the components may be used to correct the first component's first indication. Movements of the user's head may be tracked relative to an initial position of the user's head (e.g., at a time when the apparatus 11 and/or wearable user input is turned on or calibrated), or relative to an external reference frame, such as the Earth's magnetic field. For calibration of the equipment, the user may be required to look and face in the same direction simultaneously, or to look in a specific direction at a specific time and to face in a specific direction at a different specific time, during a calibration phase of the apparatus. This calibration phase may occur shortly after the apparatus has been switched on (or at a later time, trigged by the user or the controller), and may enable the controller to determine initial angles of looking and facing for the user. The user may be required to confirm, in the calibration phase, that he or she is looking in the same direction as he or she is facing (i.e., that his or her head is pointing in the same direction as his or her torso), e.g., by pressing a button, or that he is looking in a specified direction at one time and facing in a specified direction at another time. There may also be other steps to the calibration procedure, such as performing one or more predetermined movements.

After calibration, the direction in which the user is looking (i.e., the direction in which the user's head is pointing, determined using the wearable user input) and the direction in which the user is facing (i.e., the direction in which the user's torso is pointing, determined using the means for determining an angle between the first and second base parts 13, 15) may be provided to a controller and compared to determine an angle between the direction of looking and the direction of facing.

Analogously to the operation of the user input 21 illustrated in FIGS. 1 and 2 and described above, if the angle between the direction of user looking and the direction of user facing is greater than a threshold angle, the second base part 15 may be caused to rotate relative to first base part 13 about the common axis 17. The magnitude of the angle between the direction of looking and the direction of facing may determine an extent and/or speed of rotation of the first and second base parts 13, 15 relative to each other.

The wearable user input may be part of a headset (such as an audio headset, a video headset or an audiovisual headset) forming part of the apparatus 11. Alternatively, the wearable user input may be a separate device which can be fastened to the user directly or indirectly. The wearable user input may for example be fastenable to the head of the user by clipping into the user's hair or onto an ear, fastenable to a headset forming part of the apparatus 11, fastenable to a pair of glasses or hat worn by the user, or wearable as a headband or other headpiece.

In some embodiments, apparatus 11 may include at least one camera 23. The illustrated camera 23 is mounted radially outwardly of the axis 17. The camera 23 is mounted such that it points substantially radially inwardly, substantially towards the axis 17. The camera 23 is mounted on component 30 via a telescoping pole 24 with a hinge 36. The telescoping pole 24 is mounted on the component 30 at such a point on the component 30 that, when the component 30 is in its optimum ('use') position relative to the second base part 15, the camera 23 and telescoping pole 24 are directly opposite a user 37 of the apparatus 11, and the camera 23 faces the user 37 of the apparatus 11.

With the component 30 in its optimum ('use') position, the camera 23 and telescoping pole 24 may be positioned on a radial line extending from the axis 17 about which the first and second base parts 13, 15 rotate relative to each other and approximately through the axis 26 about which the rotating plate 25 is arranged to rotate.

The telescoping poles 24 illustrated in FIGS. 1 and 2 are in partially extended configurations. In an optimally extended configuration for a given user 37, the camera 23 may be roughly at the height of the stomach, chest and/or hands of the user 37 while the user 37 is using the apparatus 11 (e.g., while the user 37 is sitting in the chair 31 or on the stool, or standing on the platform, of the apparatus 11). In the optimally extended configuration of the telescoping pole 24 for that user 37, the camera 23 may be arranged such that its field of view includes the head and hands of the user 37. Arranged in this way, the camera 23 may be able to track the movement of the user's head and/or the movement of the user's hands. The telescoping pole 24 of the apparatus 11 allows the height of the camera 23 to be adjusted to ensure that the field of view of the camera 24 includes the head and/or hands of the user 37. This allows users of different heights to use the apparatus 11.

When the apparatus 11 is not in use, the telescoping pole 24 can be fully retracted. When the telescoping pole 24 is in the fully retracted configuration, the total length of the telescoping pole 24 between the top of the camera 23 and the hinge 36 is approximately the same as or less than the diameter of the component 30. The hinge 36 allows the telescoping pole 24 to fold down against the component 30. The recess in the second base part 15 is arranged such that it is high enough to receive the combined height of the component 30 and the telescoping pole 24 when the telescoping pole 24 is folded down against the component 30, and wide enough to receive the full diameter of the component 30. Thus, when the apparatus 11 is not in use, the user input 21 (including the camera 23 and extending pole 24) can be stowed in the recess in second base part 15 by rotating the user input 21 about the axis 32 until the user input 21 is fully within the recess.

In some examples, the user input 21 can rotate in either direction (clockwise or anticlockwise) about the axis 32 to be stowed in the recess. In other examples, the user input 21 can only enter the recess from one side. As described above, the apparatus 11 may include a motor 27 which can cause the user input 21 to rotate about the axis 32, or may be arranged to be rotated about the axis 32 by hand. In examples in which a motor 27 is included, the motor 27 may constrain the user input 21 such that it cannot move out of the recess, once stowed, until the motor 27 is controlled by the controller. This may prevent the user input 21 from inadvertently coming out of the recess, e.g., when the apparatus 11 is being moved.

When the apparatus 11 is switched on, or in response to an input from a user of the apparatus 11, the component 30 may rotate (under the action of motor 27 if present) about the axis 32 out of the recess in the second base part 15, to the optimal ('use') position relative to the second base part 15. A further motor (not illustrated) may then cause the telescoping pole 24 to pivot about the hinge 36, such that the telescoping pole 24 assumes an approximately vertical orientation. While the telescoping pole 24 is pivoting about the hinge, or after the telescoping pole 24 has finished pivoting to the approximately vertical orientation, another motor (not illustrated) may cause the telescoping pole 24 to extend. The extension of the telescoping pole 24 may raise the height of the camera 23 to a predetermined height. The predetermined height may be adjustable using user inputs.

In other embodiments, the hinge 36 and telescoping pole 24 may not be provided with motors, and a user of the apparatus 11 may cause the telescoping pole 24 to pivot about the hinge 36 and to extend to the desired height by applying appropriate pulling and/or pushing forces to the telescoping pole 24.

Because the user input 21 is attached to the second base part 15 and can be fixed in angular position about the axis 32 relative to the second base part 15 by the motor 27 (or another component of the apparatus 11 if no motor is present), the camera 23 rotates with the second base part 15 whenever the second base part 15 rotates about the axis 17 relative to the first base part 13. The camera 23 therefore faces the user 37 throughout the user's use session, enabling the camera 23 to track the head and/or hand movements of the user 37 no matter how much the user rotates in the reference frame of the room (i.e., no matter how much the second base part 15 rotates relative to the first base part 13).

In further embodiments, a similar camera may instead or additionally be provided remote from the main body of the apparatus 11, i.e., not mounted on the apparatus 11. The remote camera may, for example, be located on a wall, a ceiling, the floor, a stand or a shelf in the room in which the apparatus 11 is located, and may perform a similar role to (or the same role as) the apparatus-mounted camera 23 described above.

In some examples, the apparatus-mounted camera 23 or the remote camera may monitor movement of the user's head to determine the user's direction of looking (i.e. the direction in which the user's head is pointing). To assist the camera in doing this, the headset that the user wears may be provided with visual indicators (such as markings, reflectors or light-emitting diodes (LEDs)) which are arranged in a known pattern that varies around the outer circumference of the headset (and thus around the user's head while he/she is wearing the headset). This pattern may enable the controller to distinguish which part of the user's head is in the camera's field of vision and therefore determine the direction in which the user is looking.

The camera may additionally or alternatively monitor movement of the user's hands and/or movement of a hand-held user input. To assist the camera in monitoring the movement, the user may wear gloves which include visual indicators such as the markings, reflectors or LEDs as previously described in the context of the headset, or the hand-held user input may include such visual indicators.

The first base part 13 and/or the second base part 15 may include a recess or recesses for receiving a controller. The controller may, for example, take the form of a personal computer, a games console, a mobile phone, a tablet or another electronic device which includes a processor. The controller may be capable of receiving user inputs and generating outputs.

Such a controller can be inserted into the recess and connected (e.g., using wires or wirelessly) to components of the apparatus 11, such as the motor 18 which causes the first base part 13 and the second base part 15 to rotate relative to each other about the axis 17; the motor 27 (if present) which causes the user input 21 to rotate relative to the second base part 15 about the axis 32; the motors (if present) which cause the telescoping pole 24 to pivot about the hinge 36 and/or extend/shorten; the user input 21 which allows a user 37 of the apparatus 11 to provide inputs to the controller and control, for example, the relative movement of the first and second base parts 13, 15; the camera 23 which allows the user 37 of the apparatus 11 to provide inputs to the controller (or to a remote camera if there is no camera 23 mounted on the apparatus 11); and any other peripheral devices which may provide input/output functionality for a user 37 of the apparatus 11.

The recess may include means for connecting the controller to any or all of the above components of the apparatus 11, and to a source of electrical power. Power may be delivered from an external source (i.e., a source external to the apparatus 11) to the first base part 13 of the apparatus 11 via an electrical cable or cables. The power may be delivered to the first base part 13 rather than the second base part 15 because the first base part 13 may remain stationary (relative, for example, to the surface on which the apparatus 11 is mounted) during use of the apparatus 11, while the second base part 15 may rotate (relative, for example, to the surface on which the apparatus 11 is mounted).

In the illustrated example, the recess for receiving the controller is provided in the second base part 15. A controller inserted in the recess of the second base part 15 will rotate with the second base part 15, relative to the first base part 13, if the second base part 15 is caused to rotate. This arrangement advantageously means that the controller, the components (such as the camera 23 and the motors 18, 27) and any cables connecting the controller and the components are arranged to rotate about the axis 17 together. This means that the cabling is not wrapped around the axis 17 as the second base part 15 rotates relative to the first base part 13.

To enable electrical power to be transferred between the first base part 13 and the second base part 15, the apparatus 11 may include one or more slip rings.

As illustrated in FIG. 2, a user 37 of the apparatus 11 may, during use of the apparatus 11, wear a headset 29 on his or her head. The headset 29 may provide visual and/or audio information to the user 37, such as a visual or audio representation of a virtual reality environment. The visual and/or audio information may be generated by a controller in the recess of the apparatus 11 to which the headset 29 may be connected via not-illustrated cables. The cables may, for instance, emerge from an aperture in the top or the back of the chair 31, so that the cables are provided at roughly the right height for connection to the headset 29 (or, in examples in which there is no chair, from a suitable aperture in the second base part 15). Advantageously, because the headset 29, the cables and the controller all rotate with the second base part 15 relative to the first base part 13, the user 37 does not become tangled in the cables when the user 37 causes the second base part 15 to rotate relative to the first base part 13. In some examples, the headset may be wirelessly connectable to the controller.

In some examples, the means for determining an angle between the first base part 13 and the second base part 15 may be a stepper motor. The stepper motor may also be able to cause the second base part 15 to rotate relative to the first base part 13.

Although in the illustrated examples the base parts 13, 15 are substantially circular in cross section and substantially cylindrical in overall shape, in other examples, the first and second base parts 13, 15 may have other cross-sectional profiles and other overall shapes.

Although in the illustrated embodiment there is provided only one motor 18 for causing the second base part 15 to rotate about the axis 17 relative to the first base part 13, in other examples a plurality of motors may be provided for causing the second base part 15 to undergo said rotation relative to the first base part 13.

In the embodiments described above, the means for determining an angle between the first base part 13 and the second base part 15 may enable the apparatus 11 to determine the direction in which a user 37 of the apparatus 11 is facing (i.e., the direction in which the user's body is pointing). This may effectively define a reference frame of the user. The reference frame rotates relative to the first base part 13 when the second base part 15 rotates relative to the first base part 13.

In use, the camera 23 on the telescoping pole 24 is stationary in the reference frame of the user 37, whether or not the reference frame of the user is rotating relative to the first base part 13. The camera 23 rotates with the second base part 15 whenever the second base part 15 rotates relative to the first base part 13. The camera 23 therefore rotates with the user 37 of the apparatus 11 during use of the apparatus 11. The camera 23 is able to monitor the motion of the user's head and/or hands in the reference frame of the user, even if the reference frame is rotating relative to the first base part 13, since the camera is also rotating in the same sense and to the same extent as the reference frame.

The apparatus 11 can therefore monitor at least the following user input parameters: the direction in which the user is facing (using the means for determining an angle between the first base part 13 and the second base part 15); the direction in which the user is looking (using the camera 23 to monitor movements of the user's head in the user's reference frame or, in other embodiments, the user input); the direction in which the user is pointing or gesturing (using the camera 23 to monitor movements of the user's hand(s) in the user's reference frame); the direction in which the user wishes to turn (by monitoring how the user 37 moves the rotating plate 25 relative to the component 30, or how the user 37 moves his/her head relative to his/her body); and other inputs from the user (by monitoring further user inputs such as the foot pedals 28 and any other user input devices included in the apparatus 11).

The fact that a user 37 of the apparatus 11 is caused to rotate in real space (about the axis 17 as the second base part 15 rotates about the axis 17 relative to the first base part 13) when the user 37 provides an input to the controller which causes the user to move in a virtual reality environment may help reduce or prevent the feelings of nausea and other discomfort induced by virtual reality apparatus.

Furthermore, the fact that a controller may control motor 18 to change the angle between the first base part 13 and the second base part 15 of the apparatus 11 means that the controller may change the direction in which a user 37 of the apparatus 11 faces in a virtual reality environment and in the real world simultaneously. Thus the controller may be able to control the direction in which the user 37 of the apparatus 11 looks in the virtual reality environment to prevent the user 37 from missing an event in the virtual reality environment without making the user feel as sick as if the movement in the virtual reality environment had been simulated without a corresponding movement in the real world.

The apparatus described above include a user input 21 which is operated by a foot or feet of a user. Such a foot-operated user input 21 may be advantageous, in that controlling at least some aspects of movement in a virtual reality environment with the feet may be intuitive. Furthermore, using the feet to control those aspects of movement in the virtual reality environment leaves the hands and arms free to perform other operations, such as making gestures or manipulating a further user input (e.g., a gun or other hand-held controller).

In other examples, a hand-operated user input, such as a joy stick, may be provided instead of or in addition to a foot-operated user input. The hand-operated user input may perform some or all of the movement-related user input functions performed by the foot-operated user input 21 described above, in which case some or all of the components of the foot-operated user input 21 may not be required.

In other examples, there may be complementary hand- and foot-operated user inputs, both of which may allow a user to provide movement-related inputs to a controller. For example, foot pedals may be provided (e.g., corresponding to a brake and an accelerator) for controlling movement in one sense (e.g., forwards and backwards), and a hand-held controller (e.g., a steering wheel) may be provided for controlling movement in another sense (e.g., left and right, side to side). In such an example, the hand-held steering wheel may, in conjunction with a controller and a motor (such as motor 18), cause the second base part 15 to rotate relative to the first base part 13, while the foot pedals may not cause movement of the second base part 15 relative to the first base part 13.

In some of the examples described above, a wearable user input is used to control rotation of first and second base parts of an apparatus for virtual reality simulation, by comparing a direction in which a user of the apparatus is looking (determined using the wearable user input) and a direction in which the user is facing (determined using the means for determining an angle between the first base part and the second base part). The speed and direction of relative rotation of the first and second base parts may be controlled in dependence upon the angle between the direction of user looking and the direction of user facing.

A similar arrangement may be used to control a direction of movement of a vehicle such as a mobility scooter. A user of a mobility scooter may wear a wearable user input as described above somewhere on his or her head (e.g., clipped to a glasses frame) to determine the user's direction of looking. The mobility scooter may be equipped with one or more sensors (such as an accelerometer, a magnetometer, a gyroscope or a navigation system receiver) arranged to determine the orientation of the mobility scooter (analogous to the user's direction of facing in the example of the apparatus for virtual reality simulation discussed above). A difference between the user's direction of looking and the orientation (e.g., the current direction of movement) of the mobility scooter may be used to control the direction of movement of the mobility scooter.

For example, a user of a mobility scooter may initially be travelling due north on the mobility scooter, with her head pointing in the direction of travel (north). The user may wish to change the direction of travel of the mobility scooter so that the direction of travel is north-east. To cause the direction of travel to change, the user looks north-east. The wearable user input detects the magnitude and direction of the change in direction of user looking, and sends a signal to a controller of the mobility scooter. The controller causes the wheels of the mobility scooter to rotate through an appropriate angle to cause the mobility scooter to change its direction of travel from north to north-east.

If the user of the mobility scooter subsequently wishes to travel north-west, the user may move her head so that she is facing north-west. The wearable user input will detect the change in direction of user looking and send a signal to the controller of the mobility scooter. The controller causes the wheels of the mobility scooter to rotate through an appropriate angle to cause the mobility scooter to change its direction of travel from north-east to north-west.

Such an arrangement may be particularly advantageous for individuals with limited ability to control steering apparatus (e.g., handlebars or a steering wheel).

The invention claimed is:

1. An apparatus for virtual reality simulation, including:
   a first base part and a second base part arranged to be rotatable relative to each other about a common axis;
   a processor input arranged to receive a drive rotation signal;
   a motor drive responsive to the drive rotation signal to cause driven rotation of the base parts relative to each other;
   a camera mounted radially outwardly of the common axis and such that it is arranged to rotate with the second base part when the second base part rotates relative to the first base part;
   a device for determining an angle between the first base part and the second base part; and
   a wearable user input wherein the user input is arranged to determine a direction in which a user of the apparatus is looking; and
   wherein the camera is arranged to track the movement of the user's head and/or the movement of the user's hands.

2. An apparatus as claimed in claim 1, including a user input device arranged to allow a user of the apparatus to control rotation of the first base part and the second base part relative to each other about the common axis.

3. An apparatus as claimed in claim 2, wherein the user input device is a foot-operated user input.

4. An apparatus as claimed in claim 2, wherein the user input device includes a rotating plate.

5. An apparatus as claimed in claim 2, wherein the user input device includes at least one pedal.

6. An apparatus as claimed in claim 2, wherein the user input device is arranged to rotate about a further axis between a stowed position and a use position.

7. An apparatus as claimed in claim 1, wherein the device for determining an angle between the first base part and the second base part includes one of: a potentiometer; and a rotary encoder.

8. An apparatus as claimed in claim 1, wherein the camera is mounted such that the camera points substantially radially inwardly towards the common axis.

9. An apparatus as claimed in claim 1, wherein the camera is arranged such that, during use of the apparatus by a user, the camera points towards the user of the apparatus.

10. An apparatus as claimed in claim 1, wherein the camera is mounted on a telescoping pole.

11. An apparatus as claimed in claim 1, further comprising a second camera that is mounted such that it remains stationary with respect to the first base part during use of the apparatus.

12. An apparatus as claimed in claim 1, wherein the wearable user input includes one or more of: a gyroscope; an accelerometer; and a magnetometer.

13. An apparatus as claimed in claim 1, including a chair mounted on the second base part such that the chair is arranged to rotate with the second base part relative to the first base part.

* * * * *